United States Patent [19]

Fasano

[11] 4,402,031

[45] Aug. 30, 1983

[54] GAS TUBE PROTECTOR MODULE

[75] Inventor: Michael Fasano, Syosset, N.Y.

[73] Assignee: Porta Systems Corp., Syosset, N.Y.

[21] Appl. No.: 327,801

[22] Filed: Dec. 7, 1981

[51] Int. Cl.[3] .................................... H02H 9/06

[52] U.S. Cl. .................................... 361/124; 361/119; 361/120

[58] Field of Search ............... 361/124, 119, 120, 125, 361/56, 117; 337/15, 28, 29, 32, 33, 34; 313/325, 231.1; 315/36

[56] References Cited

U.S. PATENT DOCUMENTS

| | | | |
|---|---|---|---|
| 3,573,695 | 4/1971 | Geyer et al. | 337/29 |
| 3,825,867 | 7/1974 | Georgopulos | 337/32 |
| 4,004,263 | 1/1977 | Carney | 361/124 X |
| 4,074,337 | 2/1978 | Debortoli et al. | 361/119 X |
| 4,335,416 | 6/1982 | Hollfelder et al. | 361/124 X |

*Primary Examiner*—Patrick R. Salce
*Attorney, Agent, or Firm*—Charles E. Temko

[57] ABSTRACT

A gas tube protector device for individual telephone subscriber circuits including a secondary air gap means which becomes operative in the event of gas tube failure with accompanying voltage surge.

3 Claims, 4 Drawing Figures

GAS TUBE PROTECTOR MODULE

BACKGROUND OF THE INVENTION

This invention relates generally to the field of telephone protector modules of a type particularly adapted for the protection of individual subscriber pairs, and more particularly to one employing a known gas tube arcing device in lieu of the more commonly used carbon arc protective units.

Gas tube type protection modules are presently in common use in the telephone art, and are constantly gaining further acceptance in the industry. Almost inevitably, they are provided with a heat sensitive means which enables the gas tube to be bypassed should a current surge continue long enough to melt fusable elements, a type of protection also often offered in the case of carbon arc type protection modules. Until recently, little thought has been given to the provision of secondary air gap means over which momentary voltage surges can arc should the gas tube develop leakage, or otherwise become inoperative. In such cases, the momentary surge is not sufficient to fire the heat sensitive device, and where the gas tube is inoperative, no arcing to ground takes place. In such case, upon the occurrence of momentary surges, the module does not provide protection, and sensitive equipment may be damaged. This is particularly true in the case of solid state office equipment with which newer telephone offices are provided.

SUMMARY OF THE INVENTION

Briefly stated, the invention contemplates the provision of an improved gas type telephone protector module, in which the above mentioned disadvantage has been substantially eliminated. Heat sensitive grounding is also accomplished in a conventional manner by the firing of a heat coil resulting in the resiliently urged movement of a tip member thereof which contacts a transversely extending grounding plate supported by the ground pin. Voltage surge operation conducts the surge through one or both parts of the transversely mounted gas tube element in turn conducting to the ground pin. A secondary air gap which becomes operative upon a voltage surge when the gas tube is wholly or partially inoperative is provided by surrounding the tip of the heat coil with a conductive eyelet encased in an insulative spacer block which maintains the rim of the eyelet a short distance, in the order of 0.005 inches from the ground plate.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figures 1, 2:
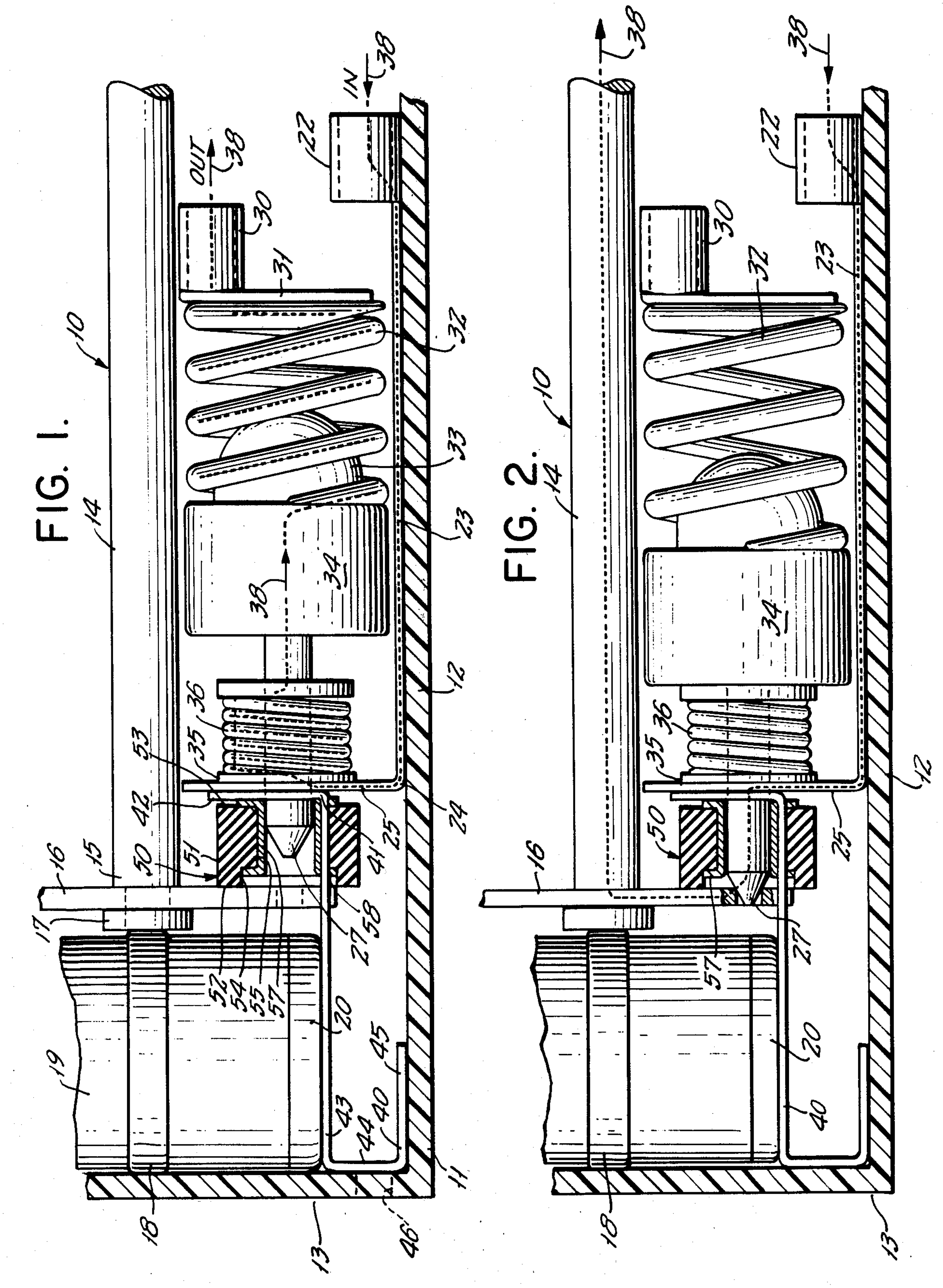
FIG. 1 is a fragmentary schematic sectional view of an embodiment of the invention, showing normal operation.
FIG. 2 is a corresponding sectional view thereof, showing the operation of heat sensitive means grounding a surge current.

With reference to FIG. 1 in the drawing, the device, generally indicated by reference character 10, includes a casing element 11, having a plurality of side walls, one of which is indicated by reference character 12, and an end wall 13. A centrally positioned longitudinally extending ground pin 14 terminates at an inner end 15 and supports thereat a transversely extending ground plate 16 and a brass spacer 17 which contacts a central annular contact 18 of a three-element gas tube 19 of a type known in the art. Reference character 20 designates an end terminal of the tube 19, it being understood that essentially one half of the module is disclosed, which protects either a tip or ring circuit of an individual subscriber pair, the opposite side of the module (not shown) protecting the other tip or ring circuit, as the case may be.

For each circuit, there is provided an input terminal 22 interconnected to a long contact 23 having a bent portion 24 leading to a transverse portion 25. The portion 25 includes an orifice 26 allowing penetration of a heat coil pin 27.

The corresponding output terminal 30 is interconnected to a short contact 31 overlying a compression spring 32, an opposite end of which surrounds a projection 33 on a movable conductive member 24 which supports the pin 27. The heat coil bottom 35 is conventional and is wound with the usual resistance wire 36. The pin is soldered within the bottom 35 by a very thin film of solder which melts when the coil becomes heated due to an excess current surge. During normal operation, current flows into and out of the module as indicated by the arrows 38.

Referring to the lower left hand corner of FIG. 1, a combination contact 40 includes an inner end 41 having a transversely extending portion 42, as well as an outer end 43 having a transversely extending portion 44 and a longitudinally extending terminal 45. An opening 46 in the end wall 13 permits the insertion of a test probe whereby the module may be tested after installation, in a manner known in the art.

Between the transverse portion 42 and the ground plate 16 is an insulating spacer block 50 having an outer surface 51, and end surfaces 52 and 53. Extending longitudinally through the block 50 is a bore 54 and a counterbore 55. A conductive eyelet 56, preferably of brass, includes a tubular portion 57 and a flange portion 58 which is disposed in the bore 54 in such manner that the outer surface is positioned approximately 0.005 inches from the ground plate 16 to form an air gap thereat.

FIG. 2 illustrates the operation of the device 10 upon the occurrence of an excess current surge of duration sufficient to fire the heat coil. In this case, the pin 27 moves leftwardly to make contact with the ground plate, preferably in a small opening 59 to provide a greater contact area. The surge current flows in the direction indicated by the arrows 38 to ground.

Figure 3:
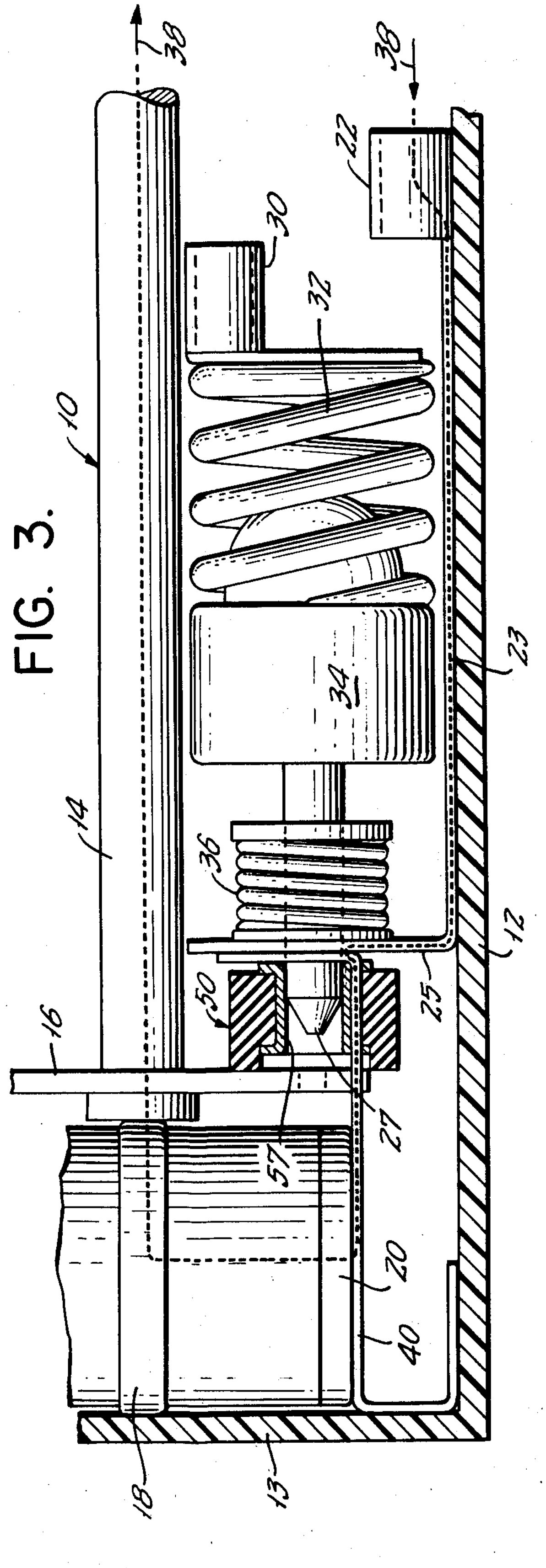
FIG. 3 is a corresponding sectional view thereof, showing voltage surge operation resulting in arcing within a gas tube element.

FIG. 3 illustrates the flow of an excess voltage surge, which arcs through the gas tube and then through the central contact thereof to the ground pin. The flow of current is indicated by arrows 38.

Figure 4:
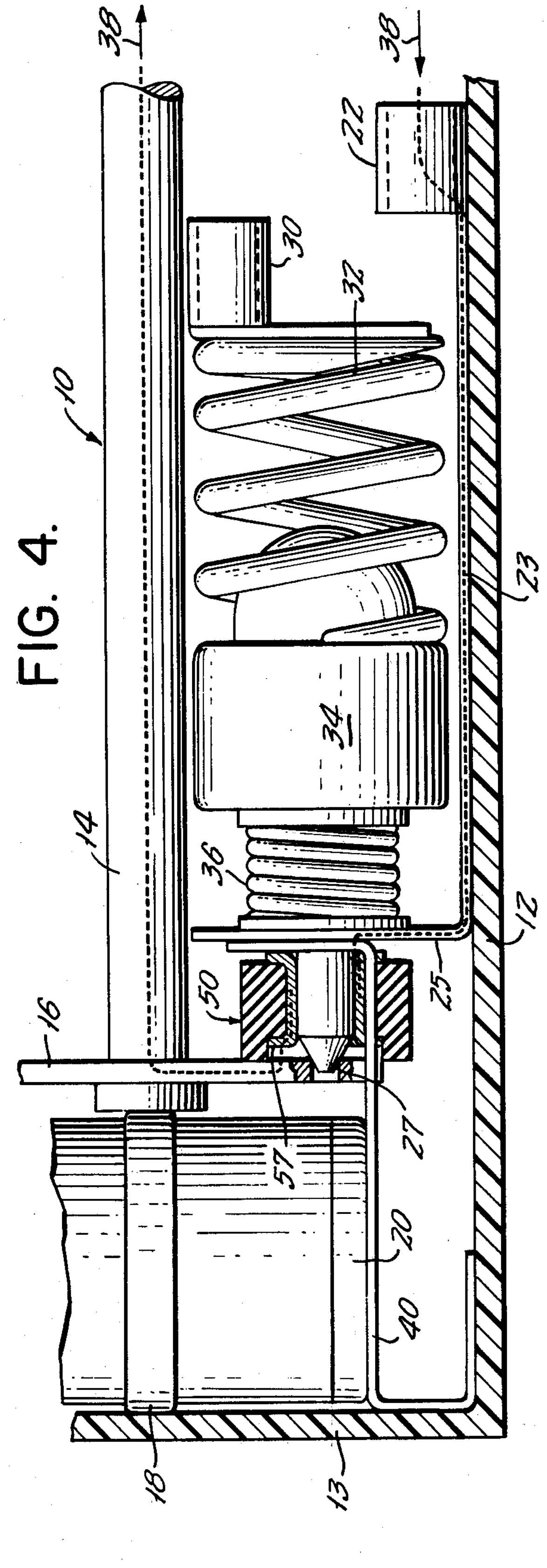
FIG. 4 is a corresponding sectional view thereof, showing the operation of secondary air gap means.

FIG. 4 illustrates secondary air gap operation, in which, because of a defective gas tube arcing does not take place therein. In such case, the voltage arcs from the flange portion 58 of the eyelet 56 directly to the ground plate. Current flow is indicated by the arrows 38.

I wish it to be understood that I do not consider the invention limited to the precise details of structure shown and set forth in this specification, for obvious modifications will occur to those skilled in the art to which the invention pertains.

I claim:

1. In a gas tube protector module for protecting a telephone circuit from excess current and voltage surges, including an insulative housing element, a pair of tip and ring contact elements, a grounding pin, a heat sensitive element, and a gas tube element; said contacts each including a pair of interconnected contact members communicating externally of said housing to a circuit to be protected, a ground pin and a transversely extending ground plate carried by said ground pin, the improvement comprising: a heat coil pin overlying said ground plate and including resilient means for urging said pin into contact with said ground plate upon operation of said heat sensitive element; an insulative spacer block interposed between said heat sensitive element and said ground plate, said block having a through bore for passage of said heat coil pin; a fixed conductor member disposed in said through bore, communicating with said heat sensitive element at a first end thereof, and being spaced a short distance at a second end thereof from said ground plate to form an air gap; and means conductively interconnecting one of said tip and ring contacts to said gas tube element and said heat sensitive element, whereby said air gap becomes operative to arc excess voltage surges upon failure of said gas tube element.

2. The improvement in accordance with claim 1, said fixed conductive member being in the form of a hollow cylinder at least partially surrounding said pin.

3. The improvement in accordance with claim 1, said fixed conductive member being in the form of a conductive eyelet, having a cylindrical portion disposed within said bore and at least partially surrounding said pin, and a radially extending flange portion disposed in a counterbore communicating with said bore, to form said air gap.

* * * * *